O. C. KNIPE.
SHAFT OR JOURNAL LUBRICATOR.
APPLICATION FILED AUG. 5, 1904.
922,155.
Patented May 18, 1909.
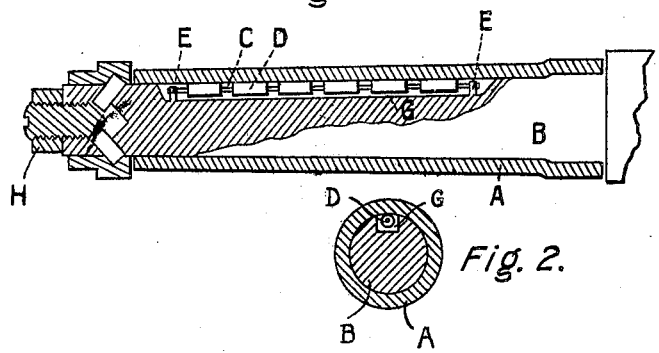
WITNESSES:
INVENTOR
ATTORNEY

UNITED STATES PATENT OFFICE.

OLIVER C. KNIPE, OF NORRISTOWN, PENNSYLVANIA, ASSIGNOR TO ALFRED S. LEWIS, OF PHILADELPHIA, PENNSYLVANIA.

SHAFT OR JOURNAL LUBRICATOR.

No. 922,155.　　　Specification of Letters Patent.　　　Patented May 18, 1909.

Application filed August 5, 1904. Serial No. 219,675.

*To all whom it may concern:*

Be it known that I, OLIVER C. KNIPE, a citizen of the United States, residing at Norristown, in the county of Montgomery and State of Pennsylvania, have invented a new and useful Shaft or Journal Lubricator, of which the following is a specification.

This invention relates to means for lubricating shafts or journals, the object being to provide for a free circulation of oil or similar lubricant and to insure clean oil, free from detritus or grit, being supplied to the contact surfaces.

The invention is carried out by providing a well for the lubricant and mounting on the fixed member of the relatively rotating parts in which the well is formed rollers adapted to pick up from the well lubricant and supply it to the rotating member. The rollers may be plane in surface or grooved spirally or may have closed spiral ducts in the form of a tubular worm.

My invention therefore comprises a lubricator consisting of rollers engaging the rotating element along a line of contact and supported free to turn in a well of lubricant formed in the top of the fixed member of the device.

The several features of novelty will be hereinafter definitely indicated.

In the drawings, Figure 1 is a sectional view of a vehicle axle and its box; Fig. 2 is a transverse section on a plane cutting the shaft at right angles.

Referring to the axle box shown in Figs. 1 and 2, the axle is provided with a groove G which forms a well for the lubricant, said groove being formed in the top of the spindle B. On supporting walls or webs E of brass or soft metal forced in the groove is mounted a yielding or flexible shaft C on which are revolubly mounted rollers D which may be simple cylindrical tubes as indicated in Fig. 1, or may be grooved spirally on the outer surface. The rollers are mounted on their supporting rod so as to maintain an elastic or yielding contact with the axle box A and carry the lubricant upward as they are turned by the box and supply clean lubricant to the inner wall of the box from which it is distributed over the entire surfaces of both box and spindle, while the grit is gradually separated and settles to the bottom of the well. A nut H locks the box on the journal. The rod supporting the rollers is preferably made of elastic material such as brass or steel to insure light frictional contact. In the wheel axle shown in Fig. 1 is shown my adjusting device for maintaining a good adjustment, for which U. S. Patent No. 697,633 was granted me April 15, 1902.

Having thus described my invention, what I claim as new and desire to secure by Letters Patent is,

A lubricator for a journal bearing, comprising a journal having a groove in its top side extending parallel to its axis and forming a well for lubricant, an elastic rod mounted therein, a plurality of independent rollers carried by the rod, a box inclosing the journal and the rod maintaining the rollers in yielding contact with the box, whereby the rollers carry lubricant from the well to the top of the box, and a nut locking the box on the journal.

In testimony whereof I have signed my name to this specification, in the presence of two subscribing witnesses.

OLIVER C. KNIPE.

Witnesses:
　J. QUINCY ADAMS,
　O. W. PAYRAN.